Feb. 6, 1968  R. F. HILL  3,367,022
METHOD OF FORMING A URANIUM FILM ON TANTALUM
Filed Nov. 20, 1964
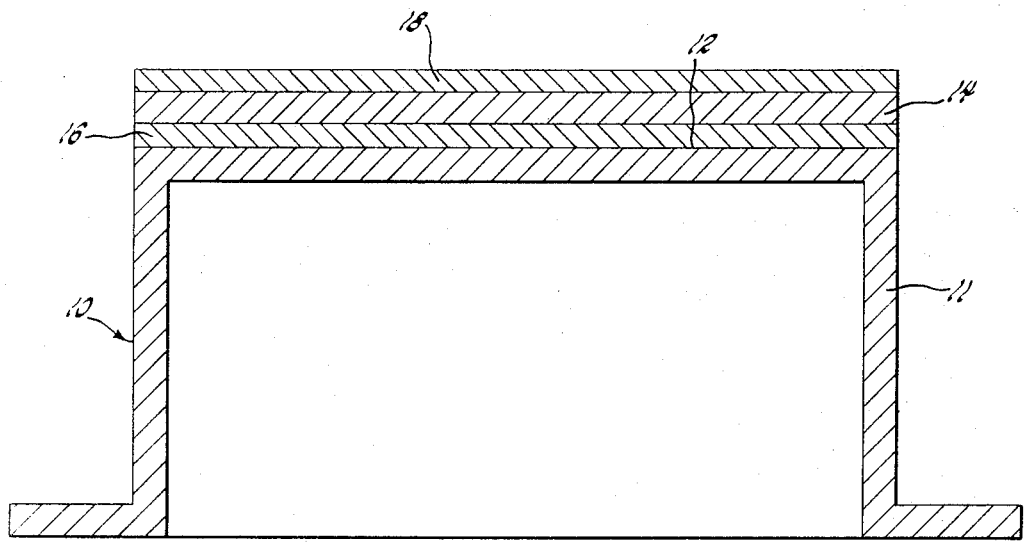
INVENTOR.
Robert F. Hill
BY
Peter P. Kozak
ATTORNEY

United States Patent Office 3,367,022
Patented Feb. 6, 1968

3,367,022
METHOD OF FORMING A URANIUM
FILM ON TANTALUM
Robert F. Hill, Warren, Mich., assignor to General
Motors Corporation, Detroit, Mich., a corporation
of Delaware
Filed Nov. 20, 1964, Ser. No. 412,685
5 Claims. (Cl. 29—527)

ABSTRACT OF THE DISCLOSURE

A method of providing a thin fissionable layer of U-235 enriched uranium-nickel alloy on a tantalum base for use in devices such as thermionic converters for nuclear reactors which involves positioning a nickel foil between a tantalum base and a uranium foil, and then heating the composite structure in an inert environment for a time and temperature sufficient for the nickel and uranium foils to melt and form a U-235 enriched nickel-uranium alloy layer which wets and adheres to the tantalum base.

---

This invention relates generally to neutronic devices of various types, such as ion chamber electrodes, which are used to supply ionizing radiation in the form of high energy fission products for measuring neutron flux. More particularly, this invention relates to a method of providing a very thin, fissionable layer of a U-235 enriched, uranium-nickel alloy on a tantalum base in such devices.

In this specification, by the term "U-235 enriched" I refer to uranium in its pure state or as it may exist in a uranium-nickel alloy wherein the U-235 isotope content of the uranium is greater than about 50 atomic percent, and typically about 93 atomic percent with the balance being substantially the U-238 isotope. However, for the purposes of the present invention the U-235 and U-238 isotopes may be considered to have the same metallurgical properties. Also by the term "atomic percent" I refer to the proportion of atoms of one element to the total number of atoms of all elements present in the mass.

Zirconium is widely used as a base material in the construction of neutronic devices, such as ion chamber electrodes and the like, due to its good machineability, high melting point, high structural strength and low neutron cross section. In many of these neutronic devices, it is desirable to provide a thin, U-235 enriched layer of uranium on a zirconium base, whereby the uranium layer has sufficient thickness to produce a maximum amount of fission fragment flux, but yet, the layer is sufficiently thin so as not to produce excessive nuclear heating of the device. Theoretically, a layer of pure, U-235 enriched, uranium having a thickness of about 0.00037 inch or about 0.4 mil should satisfy these requirements.

However, it is very difficult to thermally bond such a thin layer of pure uranium directly on a zirconium base by melting a very thin foil of the uranium of the zirconium base due to the relatively poor wetting qualities of molten uranium on zirconium and the resulting tendency of the molten uranium to "bead up" at various points on the zirconium base. Also, electrodeposition methods of providing a very thin layer of pure uranium of less than 1 mil in thickness on a zirconium base are generally unsatisfactory, since the uranium film deposited will readily oxidize, particularly in an aqueous plating bath. Uranium oxide films are undesirable in neutron devices due to the dilution of the uranium concentration which reduces the maximum fission fragment flux released per unit area.

Therefore, it is the principal object of the present invention to provide a method of forming a thin, U-235 enriched, uranium alloy layer on a tantalum member or element in a neutronic device which will provide a maximum amount of fission fragment flux without causing excessive nuclear heating of the device.

It is another object of the present invention to provide a very thin, fissionable, uranium-nickel alloy surface layer on a tantalum member which is preferably bonded to a zirconium base member used in the construction of neutronic devices, such as ionization chamber electrodes and the like.

It is a further object of the present invention to provide a method of forming a very thin, fissionable, uranium-nickel alloy surface layer on tantalum which avoids the undesirable formation of uranium oxide.

It is a still further object of the present invention to provide neutronic devices, such as ion chamber electrodes and the like, having a U-235 enriched layer of a uranium-nickel alloy on a tantalum member or element whereby the devices are capable of operating at comparatively low temperatures but which will yield a high fission fragment flux.

These and other objects are accomplished in accordance with the present invention by positioning a very thin nickel foil between a uranium foil of suitable thickness and a tantalum element and then heating the composite structure at a suitable temperature under a vacuum or inert atmosphere for a sufficient time so that the nickel and uranium will melt and form a thin, U-235 enriched, alloy layer of nickel and uranium which wets and adheres to the tantalum member. The tantalum member of the resultant composite structure may then be chemically bonded, brazed or otherwise secured to any suitable structural backing or base material, such as zirconium, which is used in the construction of the particular neutronic device being fabricated. As will hereinafter be more fully explained, the thickness of the nickel and uranium foils which form the desired alloy may vary in accordance with the present invention depending on the desired operation conditions for the particular neutron device being fabricated. These operating conditions include the required amount of fission fragment flux and the desired operating temperature. Also, the presence of the nickel in the uranium-nickel alloy layer improves the oxidation resistance of the uranium component.

Other objects, features and advantages of the present invention will be apparent from the following detailed description of certain embodiments and specific examples thereof, especially when taken in conjunction with the accompanying drawing in which FIGURE 1 is a cross-sectional view of a typical ionization chamber electrode embodying the present invention.

As shown in the drawing, the electrode 10 consists of a flanged generally cylindrical base member 11 having a flat end surface 12. In the embodiment of the present invention shown in the drawing, the base member 11 preferably is made of zirconium, although it may also be made of molybdenum or other high melting point metals or alloys having a low neutron cross section which are suitable for use in fabricating neutronic devices of this type. A strip or foil of tantalum 14, which is preferably only a few mils in thickness, is bonded to the end surface 12 of the zirconium base member by means of a nickel braze layer 16. However, it should be appreciated that other means, such as a copper braze, a chemical adhesive and the like, may be suitably employed to join the tantalum strip 14 to the metallic base member 11.

In accordance with the present invention, the outer surface layer 18 of the electrode 10 consists of a very thin, fissionable, U-235 enriched layer of a uranium-nickel alloy which provides the desired amount of ionizing radiation or fission fragment flux. It should be understood that the thickness of the uranium-nickel alloy layer 18 is greatly exaggerated in the drawing for the purpose of illustration, since the thickness of this layer is preferably less than about 2 mils, and ideally about 0.4 mil. The tantalum strip or foil 14 and the nickel braze layer 16 may be of any suitable thickness.

Tantalum has a melting point of about 2996° C. as compared to a melting point of about 1445° C. for nickel and about 1133° C. for uranium. Also, nickel and uranium are miscible in all proportions in the liquid state at temperatures above the melting point of nickel and in certain proportions at temperatures below the melting point of either nickel or uranium. For instance, a uranium-nickel alloy consisting of 33 atomic percent nickel and 67 atomic percent uranium forms a eutectic mixture which may exist in the liquid state at a temperature of about 738° C. Moreover, nickel forms a low melting eutectic mixture with tantalum at a temperature of about 1360° C. and uranium will alloy with tantalum at its melting point of about 1133° C.

However, in accordance with the present invention, it is undesirable for the uranium to diffuse into and alloy with tantalum to any appreciable extent, since this will dilute the maximum amount of fission fragment flux released by the uranium per unit area. Also in accordance with the present invention it is undesirable for the nickel to diffuse into or alloy with tantalum to any appreciable extent, but rather, the nickel should alloy with the uranium to provide a molten uranium-nickel alloy which has good wetting properties on a tantalum surface.

Hence, in accordance with the subject process, a uranium-nickel alloy layer is formed on a tantalum element by placing a thin nickel or suitable nickel base alloy foil between the tantalum member and a thin, U-235 enriched, uranium foil and heating the nickel and uranium foils for a sufficient time at a temperature ranging between the lower eutectic melting temperature of nickel and uranium which is 738° C. and the melting temperature of uranium of about 1133° C. to form a molten uranium-nickel alloy which wets the desired surface area of the tantalum element. Preferably the composite structure is heated to a temperature ranging between about 1000° C. to about 1100° C. However, when an appreciable amount of nickel, i.e., about 50 atomic percent is to be alloyed with the uranium, it may be desirable or necessary to heat the composite structure up to temperatures of about 1500° C., provided that an appreciable amount of diffusion of the uranium or nickel into the tantalum surface is not caused at these higher temperatures.

This may be conveniently accomplished in accordance with the present invention by heating the nickel and uranium foils and the tantalum element in a suitable apparatus, such as an electrical induction furnace, to a temperature within the aforementioned temperature range. However, this heating step should be carried out in a non-oxidizing environment, such as a vacuum or inert atmosphere of argon, neon or the like, to prevent any oxidation of the uranium foil which, as previously mentioned, is undesirable. After the molten uranium-nickel alloy has wetted the desired surface area of the tantalum element, it is cooled in a vacuum or inert atmosphere so that it will solidify and become bonded to the tantalum base member. The nickel-uranium alloy thus formed is tightly adherent to the tantalum element due to an adhesive-like bonding with the tantalum surface.

The uranium content in the uranium-nickel alloy may vary considerably in accordance with the present invention, depending on the thickness of the uranium and nickel foils which are employed, although the uranium content normally should not be less than about 50 atomic percent of the alloy layer, and preferably not less than about 70 atomic percent of the alloy layer. Also, when uranium foil employed is relatively thick as compared to the nickel foil used in forming this alloy layer, the alloy layer which is formed may not be homogeneous throughout but the nickel may be alloyed with the uranium only adjacent the tantalum surface due to the differences in diffusion rates of uranium and nickel upon being melted. In this instance, the outermost portion of the alloy layer would be pure uranium.

By way of example, a nickel-uranium alloy layer was provided on a tantalum foil which was bonded to a zirconium base member by a nickel braze to form an ion chamber electrode similar to that shown in the drawing by using the following procedure. A 0.75 mil thick, U-235 enriched, uranium foil, a 5 mil thick tantalum foil, two 0.1 mil thick nickel foils and a zirconium structural member were each cleaned in a conventional ultrasonic cleaning device three separate times utilizing three different solutions which included trichloroethylene, acetone and methyl alcohol. The zirconium base member was then degassed by firing it at a temperature of about 1200° C. under vacuum in a suitable electrical induction furnace for about 30 minutes. The tantalum foil was similarly degassed by vacuum firing at about 2000° C. for about 15 minutes. The uranium foil was cleaned in a 50% concentrated aqueous nitric acid solution followed by a water and methyl alcohol rinse in a conventional udtrasonic cleaning apparatus. Since uranium oxidizes very rapidly, the foil was cleaned just prior to the brazing step. These cleaning and degassing operations are, of course, desirable to remove any impurities from the materials.

The brazing step was then carried out in the following manner. One of the nickel foils was then sandwiched between the uranium foil and the tantalum foil and the composite structure was spot-welded together by conventional means whereby an electrical current was passed through the structure at various locations. Then, in accordance with the subject process, the composite foil structure was placed in a suitable induction heated vacuum furnace and heated to a temperature of about 1000° C. for about 30 minutes, thereby causing the nickel and uranium to melt and form the desired uranium-nickel alloy which adhered to the surface of the tantalum foil upon subsequent cooling in a vacuum. After the composite structure was cooled, another strip of nickel foil was sandwiched between the tantalum foil and the zirconium base member. The latter composite structure was next spot-welded together and subsequently heated under vacuum by an electrical induction heater to a temperature of about 965° C. for about 30 minutes. Under these conditions the nickel brazing foil fused with the zirconium causing the tantalum base and zirconium member to become bonded together upon subsequent cooling. The resultant fissionable uranium-nickel alloy surface layer consisted of about 19.5 atomic percent nickel and about 80.5 atomic percent uranium.

In the above-described example of the present invention there was no tendency of the uranium-nickel alloy to "bead up" on the tantalum foil base due to the good wetting properties of the molten alloy on tantalum. Also, the uranium was not deposited in the form of an oxide layer as in the instance of conventional electrodeposition methods of forming thin uranium films on a metallic base.

Of course, it will be understood by those skilled in the art that the process conditions employed to form the resulting structure described in the above example may be varied in accordance with the present invention, and the scope of the present invention is not intended to be limited thereby, except as defined by the following claims.

I claim:

1. A method of making a neutronic device comprising positioning a thin nickel foil and a thin, fissionable, uranium foil on a tantalum member to form a composite structure, heating said composite structure in an onoxidizing environment to melt said nickel and said uranium foils and form a molten uranium-nickel alloy which wets the surface of said tantalum member and subsequently cooling said alloy to provide a uranium-nickel alloy layer bonded to said tantalum member.

2. A method of making a neutronic device comprising positioning a thin nickel foil between a thin, fissionable, U-235 enriched uranium foil and a tantalum element to form a composite structure, heating said composite structure in a nonoxidizing atmosphere to a temperature ranging between about 738° C. to about 1500° C. to cause said nickel and uranium foils to melt, thereby forming a molten uranium-nickel alloy which wets the surface of said tantalum element, and subsequently cooling said alloy to provide a uranium-nickel alloy layer bonded to said tantalum element.

3. A method of making a neutronic device comprising positioning a thin nickel foil between a thin, fissionable, U-235 enriched, uranium foil and a tantalum foil to form a composite structure, heating said composite structure in a nonoxidizing environment to a temperature ranging between about 738° C. to about 1133° C. to cause said nickel and uranium foils to melt, thereby forming a molten uranium-nickel alloy which wets the surface of said tantalum foil, cooling said alloy to provide a uranium-nickel alloy layer bonded to said tantalum foil, said alloy layer having a thickness of less than about 2 mils and including at least about 50 atomic percent uranium, and subsequently bonding said tantalum foil to a metallic base member.

4. A method of making a neutronic device comprising positioning a thin nickel foil between a thin, fissionable, U-235 enriched uranium foil and a tantalum foil to form a composite structure, heating said composite structure in a nonoxidizing environment to a temperature ranging between about 738° C. to about 1133° C. to cause said nickel and uranium foils to melt, thereby forming a molten uranium-nickel alloy which uniformly wets the desired surface area of said tantalum foil, cooling said alloy to provide a uranium-nickel alloy layer bonded to said tantalum foil, said alloy layer having a thickness of less than about 2 mils and a uranium content of at least about 70 atomic percent, and subsequently brazing said tantalum foil to a zirconium base member.

5. A method of making an ion chamber electrode comprising positioning a thin nickel foil between a thin, fissionable, U-235 enriched, clean, uranium foil and a clean, degassed tantalum foil, spot-welding said foils together to form a composite structure, heating said composite structure in a vacuum to a temperature ranging between about 1000° C. to about 1100° C. to cause said nickel and said uranium foils to melt, thereby forming a molten uranium-nickel alloy which uniformly wets the surface of said tantalum foil, cooling said alloy to provide a uranium-nickel alloy layer bonded to said tantalum foil, said alloy layer having a thickness of less than about 2 mils and a uranium content of at least about 70 atomic percent, positioning a thin nickel strip between a zirconium base member having the desired electrode shape and the exposed surface of said tantalum foil, and subsequently heating said tantalum foil, nickel strip and zirconium base member to a suitable temperature to form a nickel braze bond between said tantalum foil and said zirconium base member.

No references cited.

HYLAND BIZOT, *Primary Examiner.*